United States Patent [19]
Krips et al.

[11] 3,979,810
[45] Sept. 14, 1976

[54] METHOD OF HERMETICALLY SWAGING TUBES INTO TUBE PLATES

[75] Inventors: Herbert Krips, Bochum-Langendreer; Miroslav Podhorsky, Bochum-Linden, both of Germany

[73] Assignee: Balcke-Durr Aktiengesellschaft, Ratingen, Germany

[22] Filed: Dec. 1, 1975

[21] Appl. No.: 636,742

Related U.S. Application Data

[63] Continuation-in-part of Ser. No. 595,428, July 14, 1975.

[30] Foreign Application Priority Data

Nov. 30, 1974 Germany............................ 2456811
June 27, 1975 Germany............................ 2528739

[52] U.S. Cl............................. 29/157.4; 29/202 D; 29/421 R
[51] Int. Cl.²..................... B21D 39/06; B23P 15/26
[58] Field of Search.......... 29/202 R, 202 D, 208 D, 29/157.4, 421 R; 72/122, 125, 126, 367, 370, 377, 393; 113/1 C, 1 M, 118 C

[56] References Cited
UNITED STATES PATENTS

| | | | |
|---|---|---|---|
| 1,516,704 | 11/1924 | Braun | 29/202 D |
| 2,375,235 | 5/1945 | Maxwell | 29/157.4 X |
| 2,460,580 | 2/1949 | Huber | 29/157.4 X |
| 3,349,465 | 10/1967 | La Pan et al. | 29/157.4 X |
| 3,449,812 | 6/1969 | Hauschke et al. | 29/157.4 |
| 3,608,173 | 9/1971 | Watson et al. | 29/157.4 |

*Primary Examiner*—Victor A. DiPalma
*Attorney, Agent, or Firm*—Joseph A. Geiger

[57] ABSTRACT

A method of hermetically swaging tubes into the bores of heavy heat exchanger tube plates, by first expansion-swaging the inserted tube end portion under a very high hydraulic pressure and by then roll-swaging a portion of the expansion-swaged length portion, in order to replace the expansion-related tensile stress in the tubes with a compressive prestress, and in order to eliminate annular crevices at the inner edges of the tube plate bores.

9 Claims, 4 Drawing Figures

METHOD OF HERMETICALLY SWAGING TUBES INTO TUBE PLATES

RELATED APPLICATION

This application is a continuation-in-part of the copending application Ser. No. 595,428, filed July 14, 1975.

BACKGROUND OF THE INVENTION

1. Field of the Invention

The present invention relates to tube swaging methods, and more particularly, to a method of hermetically swaging the extremities of straight heat exchanger tubes into the bores of spaced tube plates.

2. Description of the Prior Art

The prior art relating to the field of heat exchangers includes, as a known solution to the problem of attaching straight heat exchanger tubes to spaced tube plates, the method of inserting the tubes into the receiving bores with a small assembly clearance and of subsequently expanding the received tube portions by rolling them against the bore walls. This roll-swaging operation results in a hermetic connection between the tube end portions and the tube plates.

One shortcoming of this attachment method, which has been known for decades, is that its performance requires a considerable amount of time. Another shortcoming is the risk of damage to the tube in its region of transition between the attached tube portion, which is received inside the tube plate, and the free portion of the tube. These shortcomings of the prior art roll-swaging method are particularly disadvantageous in connection with heat exchanger applications of which heavy duty operation and high reliability is required, as is the case in nuclear reactor installations, for example. Heat exchangers for this type of application are further subject to the stringent requirement that no annular crevices between the tube plate bores and the transition portion of the tubes must be present, because the latter tend to induce the much dreaded crevice corrosion. It thus becomes necessary to extend the rolling operation to at least the inner edge of the tube plate bores, and this must be done without overstressing and thereby weakening the tube in its transition portion.

In the copending application Ser. No. 595,428, filed July 14, 1975, is disclosed a novel tube attachment method which substitutes for the roll-swaging operation a hydraulic expansion-swaging operation involving the insertion of the tube into the tube plate bore with a certain assembly clearance, following which the outer extremity of the tube is attached to the outer edge of the bore, preferably in a welding operation; an expansion-swaging core is then inserted into the bore of the tube from its outer end, the core having two axially spaced grooves holding special pressure rings, so that an annular pressure space is defined between the expansion-swaging core and the tube bore in the axial space which is delimited by the pressure rings. Inner and outer core guide portions adjoin the pressure ring grooves opposite said pressure space. A source of very high pressure, connected to the annular pressure space via radial and axial supply bores in the expansion core, makes it possible to create a very high pressure inside said pressure space, as a result of which the tube is forced to expand radially against the tube plate bore. The weld at the tube extremity, or some other suitable connection, prevents the tube from shifting axially during this expansion-swaging operation.

This hydraulic method of attaching the tubes to the tube plate bores has been found to work satisfactorily, especially when U-shaped heat exchanger tubes are used which have both extremities attached to the same tube plate. A problem arises, however, when straight heat exchanger tubes are to be attached to two spaced tube plates. We have found that under these circumstances, the expansion-swaging operation has the effect of creating a tensile stress on the free tube length between the tube plates, because the radial expansion which takes place on the swaged tube portion has a certain axial contraction effect on the tube. Being restrained axially not only by the end welds but also by the swaged engagement against the tube plate bores, the tubes are consequently subject to tensile stress even in the absence of any heat exchanger operating pressure. Depending upon the particular heat exchanger application, the operating pressure of the heat exchanger may combine itself with the tensile prestress in the tubes, with the risk of creating tension cracks, where corrosion may take place. It is therefore necessary to eliminate this tensile prestress from the tubes and to preferably even create in the tubes a predetermined level of compressive prestress.

SUMMARY OF THE INVENTION

Underlying the present invention is the primary objective of devising an improved method of hermetically swaging straight heat exchanger tubes into the bores of spaced tube plates in such a way that the above-mentioned tube contracting effect and consequent tensile prestress which result from the hydraulic expansion-swaging operation are at least partially compensated for, in order to preclude the creation of cumulative tensile stresses during the operation of a heat exchanger.

Another objective to be met by the present invention is that of creating an attachment between the tubes and the tube plates which reliably prevents the creation of annular crevices at the inner edges of the tube plate bores, while avoiding overstress conditions and the resulting local weakening of the transition portion between the swaged tube portion and the non-swaged tube portion.

The present invention proposes to attain the first objective by suggesting an improved tube swaging method which provides that the tube portions — which are received in the tube plate bores with a certain insertion clearance — are first attached to the tube plates, preferably by means of a weld between their extremities and the outer edges of the tube plate bores, whereupon they are hydraulically expansion-swaged against the walls of the tube plate bores, and at least one of the two expansion-swaged end portions of each tube is longitudinally expanded in a roll-swaging operation, in order to compensate for the longitudinal contraction caused by the expansion-swaging operation.

Accordingly, while both tube end portions are first expansion-swaged against the surrounding tube plate bores, only one of the two end portions of each tube needs to be roll-swaged, in order to remove the tensile prestress from the tube. The proposed two-step swaging operation offers the additional advantage of making it possible to establish a predetermined compressive prestress in the free portions of the tubes. Since it is possible to compute the anticipated operational stress on the tubes, the novel method affords the possibility of predetermining optimal operational stress conditions by creating in the tubes a compensatory prestress opposite to the stress to which the tubes will be subjected during operation of the heat exchanger.

According to a further suggestion of the present invention, the establishment of the desired predetermined operational stress condition in the tubes is performed by choosing for the roll-swaging operation a specific fractional length portion of the total expansion-swaged tube length portion and by appropriately controlling the wall thickness to which the tube wall is reduced in the region of roll-swaging treatment. Given a certain tube length and known stress conditions inside and outside the heat exchanger tubes during operation, one can thus establish that level of prestress in the tubes which, when the operational stress is added to it, produces a minimum of stress on the heat exchanger tubes.

The second objective of the present invention, viz., the reliable elimination of all annular crevices at the inner edges of the tube plate bores, is attained, according to a further suggestion of the present invention, by reducing the expansion-swaged length portion of the tubes on the inner side of the tube plate to such an extent that, initially, a very short overlap exists between the edge portion of the tube plate bore and the transition between the swaged tube portion and the non-swaged tube portion. The invention then provides for the later roll-swaging operation to axially shift the tube portion located axially inwards of the roll-swaged region by such an amount that the previously overlapping transition portion is "extruded" from the tube plate bore.

This second mode of performing the method of the invention assures two results: firstly, it guarantees that local overstressing and weakening of the transition portion cannot take place, since the latter remains surrounded by the tube bore during the expansion-swaging operation; and secondly, it assures that no annular crevice will remain at the inner edge portion of the tube plate bore, the extrusion-type shifting of the tube having the additional effect of smoothing and intimately engaging the mating surfaces of the tube and of the tube plate bore for the total elimination of any air space therebetween.

Since there is always a certain spread of manufacturing and assembly tolerances to contend with, the second mode of performing the method of the present invention offers the additional advantage of conveniently compensating for dimensional deviations from the nominal plate thickness, for deviations from the overall tube length, and for inaccuracies in the depth of insertion of the expansion-swaging core.

The roll-swaging treatment suggested by the second mode of the novel method must be performed on both end portions of each tube. But, because the same roll-swaging treatment is also intended to establish a given level of compressive prestress in the tubes, the distance over which the tubes may be extruded from the inner sides of the tube plates will be determined by the free length of the tubes and by the prestress which is to be created in the tubes. In most cases, this displacement distance is in the order of a few millimeters.

While it is preferable to use a welded connection, in order to initially attach the outer extremities of the tubes to the outer edges of the tube plate bores and to establish leak-tightness therebetween, the latter may in certain cases be replaced by a simple flaring operation. In both instances, however, it is recommended to leave an adjoining length portion of the tube outside the hydraulic expansion-swaging range, in order to avoid excessive stress on the welded or flared connection. For the same reason, it is also recommended that the roll-swaging operation, which preferably involves only a fraction of the expansion-swaged length, be performed nearer to the inner side of the tube plate.

The proposed novel method of swaging heat exchanger tubes into the tube plates thus not only produces reliably hermetic connections between the parts, it also permits the establishment of a predetermined level of compressive prestress in the tubes, while at the same time offering an assurance against the creation of corrosion-inducing crevices at the tube bore edges, without running the risk of obtaining overstressed transition portions on the tubes.

BRIEF DESCRIPTION OF THE DRAWINGS

Further special features and advantages of the invention will become apparent from the description following below, when taken together with the accompanying drawings which illustrate, by way of example, several modes of performing the method of the invention, illustrated in the various figures as follows.

DESCRIPTION OF THE PREFERRED MODES OF PERFORMING THE INVENTION

Figure 1:
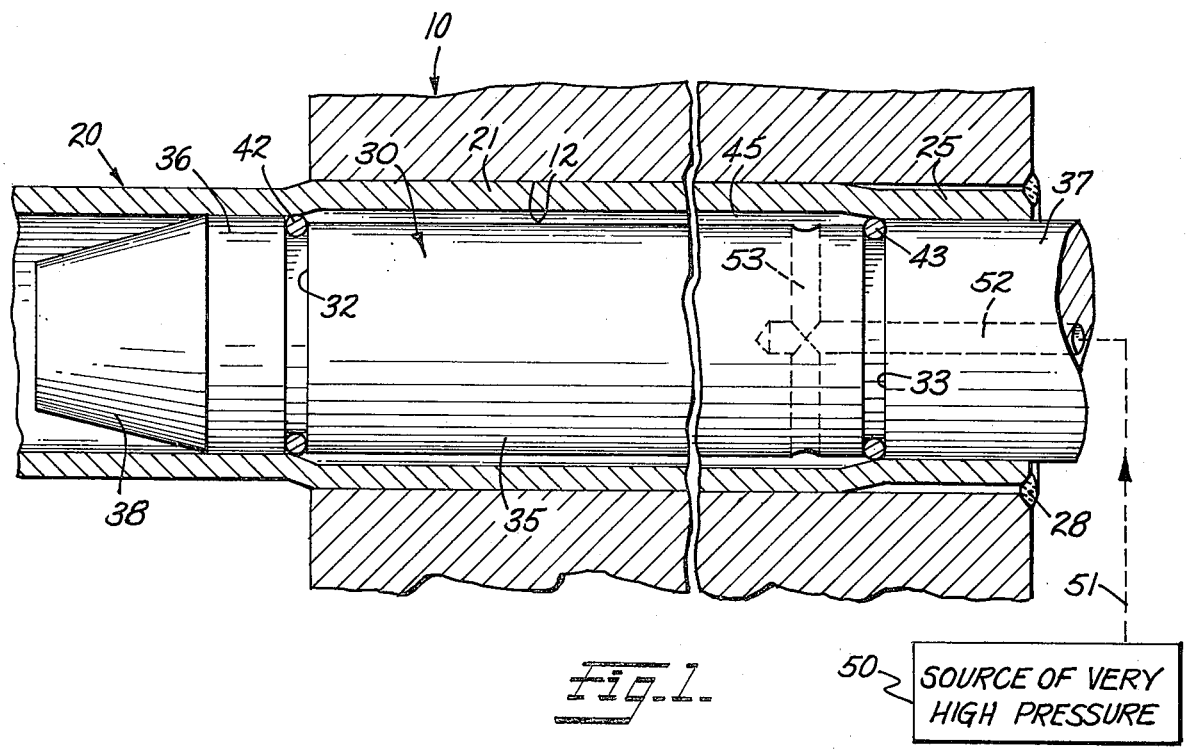
FIG. 1 shows an expansion-swaged attachment of a tube to the bore of a tube plate, with the hydraulic expansion-swaging core still in place.

Referring to FIG. 1 of the drawing, there is shown a tube plate 10 having arranged therein a typical anchoring bore 12 which is representative of a large number of identical parallel bores. The tube plate is one of two spaced tube plates of a heat exchanger, the second tube plate (not shown) having corresponding aligned anchoring bores. The actual thickness of such a tube plate is between 10 and 15 times larger than the diameter of the anchoring bores 12. Rigid structural members (not shown) hold the two tube plates 10 a fixed distance apart.

In each anchoring bore 12 is engaged a tube 20 whose overall length equals the outside distance between the two tube plates 10. In FIG. 1, the tube 20 is shown after it has been subjected to an expansion-swaging operation, in the course of which the length portion 21 of the tubing 20 has been forcibly expanded in the radial direction, to achieve intimate contact between the tube wall and the surface of the bore 12. Prior to this deformation through radial expansion, the tube 20 and the bore 12 defined a small radial assembly clearance 13 which facilitates the insertion of the tube into the bore. In FIG. 1 the amount of clearance 13 and the corresponding degree of tube deformation have been exaggerated in relation to the tube diameter, for the sake of clarity of the drawing.

The expansion-swaging operation is performed by means of an expansion-swaging core 30 which is inserted into the tube 20 from its outer end; only the inserted portion of the core 30 is shown in FIG. 1. The core 30 has two axially spaced annular grooves 32 and 33, accommodating therein two pressure rings 42 and 43 which engage the inner wall of the tube 20 with a certain degree of radial deformation. Between the inner pressure ring 42 and the outer pressure ring 43 is thus defined an annular pressure space 45 which is bounded radially by the inner diameter of the tube 20 and by the outer diameter of the core midportion 35. Prior to the radial expansion of the tube 20 in the region of the pressure space 45, the latter has a radial width of only a few tenths of a millimeter.

Inwardly adjacent to the inner pressure ring 42 and outwardly adjacent to the outer pressure ring 43 are arranged inner and outer core guide portions 36 and 37, respectively, which engage the inner wall of the tube 20 with minimal clearance. This configuration prevents the pressure rings 42 and 43 from being squeezed into the space between the core guide portions and the tube wall. A tapered core nose 38 facilitates the insertion of the latter into the tube 20. A suitable hydraulic channel 51 leads from a pressure source 50 to the pressure space 45. Only a portion of an axial supply bore 52 and an intersecting radial supply bore 53 are visible in FIG. 1. The pressures used in this type of hydraulic swaging operation range preferably between 4000 and 5000 kp/cm².

As FIG. 1 indicates, the swaged length portion 21 of the tube 20 occupies less than the entire depth of the anchoring bore 12. While the inner pressure ring 42 is positioned just beyond the inner edge of the tube plate bore 12, the outer pressure ring 43 is located a considerable distance inside the welded outer edges of the tube 20 and tube plate 10. This leaves an unexpanded tube end portion 25, the primary purpose of which is to protect the weld 28 against damaging stress from the swaging operation.

Figure 2:
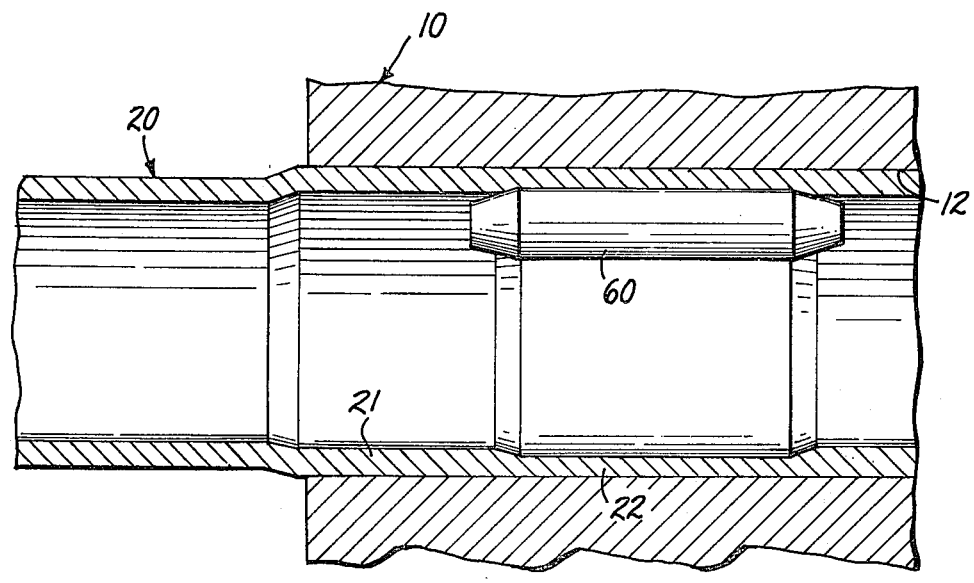
FIG. 2 shows the expansion-swaged connection of FIG. 1, as it is locally roll-swaged in accordance with a first mode of performing the method of the invention.

In FIG. 2 is shown the performance of a second swaging operation, following the expansion-swaging operation which has been described in connection with FIG. 1. A swaging roller 60 is shown to have radially compressed a portion of the previously expansion-swaged wall of the length portion 21 of tube 20. The roll-swaged length portion 22 is preferably only a fraction of the expansion-swaged length portion 21. The purpose of the second swaging operation is to counteract a certain axial contraction of the tube 20 which had been caused by the preceding expansion-swaging operation. It is a well-known phenomenon that an elastic tubular body will contract in the axial direction, if it is expanded in the radial direction, and vice versa. The expansion-swaging operation thus creates a tensile stress in the free portion of the tube 20. To this tensile prestress may be added during operation of the heat exchanger an additional operational tensile stress, so that the tube 20 is subjected to an increased risk of crack formation, especially in the region of the transition between the expanded and unexpanded tube portions. The subsequent roll-swaging operation, by radially squeezing the wall material of the tube 20, displaces that material in the axial direction, with the result that that portion of the tube 20 which is located inwardly of the swaging roller 60 is displaced axially away from the roller, thereby relieving said tensile stress.

Not only is it thus possible to eliminate any tensile prestress which might have been created by the expansion-swaging operation, it is also possible to deliberately create a compressive prestress in the tube 20. The exact distance of axial displacement of the tube 20 away from the swaging roller 60 can be controlled by appropriately choosing the length of the swaging roller 60 and the radial depth to which the previously expansion-swaged tube wall in length portion 21 is rolled and compressed.

In connection with a particular heat exchanger installation, it is thus readily possible to create such a level of compressive prestress in the tubes 20 that the operationally induced tensile stresses — which are known, or can be determined through computation — are partially or fully offset by the compressive prestress. One can thus attain optimal stress conditions under operation, or one may safely subject the heat exchanger to operating conditions which would otherwise create excessive stress conditions in the tubes. This possibility of minimizing the tensile stress in the heat exchanger tubes is particularly important in connection with heat exchangers for nuclear power installations, where the risk of crack formation under tension and the concomitant danger of corrosion must be avoided at all cost.

Figure 3:
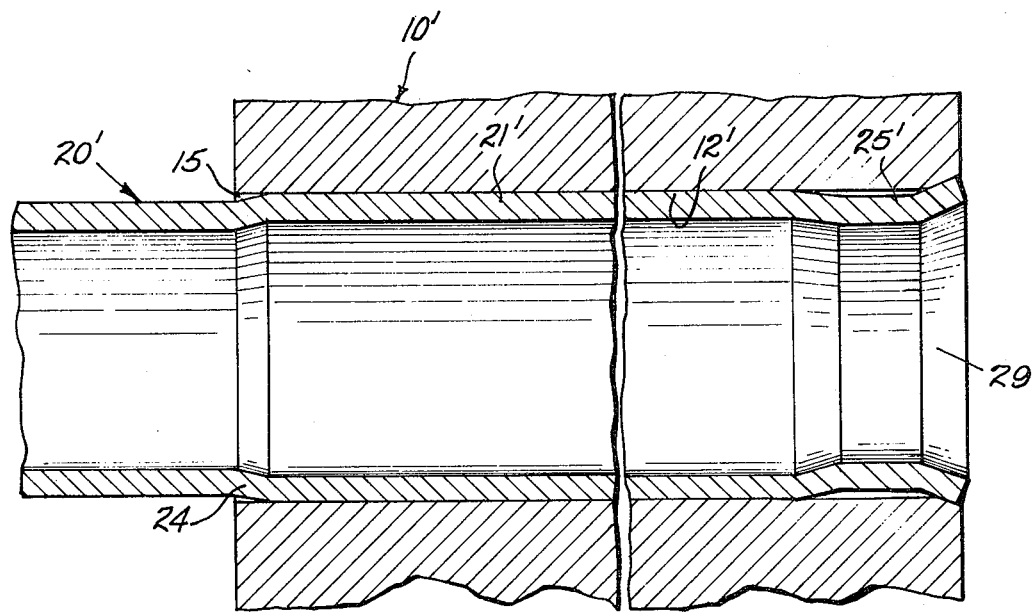
FIG. 3 shows a different expansion-swaged attachment.
Figure 4:
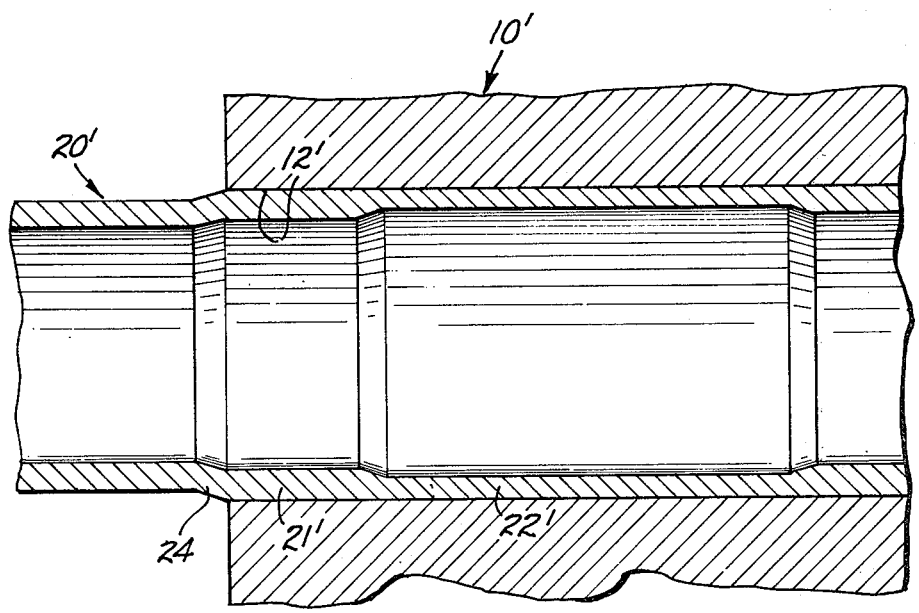
FIG. 4 shows the connection of FIG. 3, as it is locally roll-swaged in accordance with a second mode of performing the method of the invention.

In FIGS. 3 and 4 is shown a modified mode of performing the method of the invention, this mode being aimed particularly at the elimination of a potentially corrosion-inducing feature of swaged tube connections.

The configuration of FIG. 3 features a tube 20' which has been expansion-swaged into the tube plate bore 12' of a tube plate 10'. By way of showing an alternative initial attachment method, to take the place of the weld 28 of the first mode, FIG. 3 shows a flared extremity 29 of the tube 20' and a shorter unexpanded tube end portion 25'. It should be understood that either of the two modes of performing the novel method could use the weld connection of FIG. 1 or the flared connection of FIG. 3.

The essential distinction between the configuration of FIG. 1 and that of FIG. 3 is that in the latter the transition portion 24 between the unexpanded tube and the swaged length portion 21' forms a short overlap with the inner edge portion of the tube plate bore 12', thereby defining a narrow annular crevice 15. Such a crevice, if left in the assembly, would quickly induce dangerous crack corrosion.

However, as FIG. 4 indicates, the subsequent roll-swaging operation causes the inwardly adjacent portion of the tube 20' to be extruded from the tube plate bore 12' by a distance which is equal to or larger than the initial overlap between the transition portion 24 and the edge portion of the bore 12'. The prestress compensating feature of the roll-swaging operation is thus being utilized to simultaneously produce an edge configuration at the inner end of the tube plate bore 12' which safely precludes any crevice formation.

While the positioning of the inner pressure ring 42 beyond the inner edge of the tube plate bore 12 (FIG. 1) is apt to likewise produce a crevice-free edge configuration, the consistency of obtaining this result is subject to manufacturing and assembly tolerances. Under these tolerances, it is possible that the inner pressure ring 42 may be located too far inside the tube plate bore 12', resulting in the formation of an annular crevice, or it may be located too far beyond the edge of the bore 12, in which case the short tube portion between the pressure ring 42 and the inner edge of the bore 12 could, due to the absence of radial restraint there-against, suffer too much radial deformation, thereby dangerously weakening the tube 20 in this area.

The two-step swaging method of FIGS. 3 and 4 thus offers an additional factor of reliability and assembly safety, by always locating the expansion-swaging operation within the length of the tube plate bore 21', while at the same time eliminating the risk of leaving an annular crevice around the transition portion 24 of the tube 20'. The actual extruding displacement of the tube 20' is, of course, subject to the limitations imposed by the degree to which this displacement first decreases the tensile prestress in the tube 20', and then builds up a compressive prestress instead. Lastly, the extruding action has the additional advantage of creating a very intimate contact between the bore portion which was initially a flank of the crevice 15 and that tube surface portion which comes in contact with it.

It will be noted that while the first-described mode of performing the method of the invention may achieve its purpose, if only one of the two expansion-swaged tube end portions is subjected to a roll-swaging operation, the second mode requires that both tube end portions are roll-swaged, in order to obtain the desired result.

It should be understood, of course, that the foregoing disclosure describes only preferred modes of performing the method of the invention and that it is intended to cover all changes and modifications of these examples of the invention which fall within the scope of the appended claims.

We claim the following:

1. A method of hermetically swaging tubes into the bores of tube plates, which method is partilularly suited for the attachment of straight heat exchanger tubes to two rigidly spaced tube plates having bores which are several times longer than wide and whose diameter defines with the outer tube diameter an assembly clearance, said method comprising the steps of:
    positioning a tube in a tube plate bore in such a way that its major length portion extends from the inner side of the tube plate and its outer extremity is substantially in alignment with the outer side of the tube plate;
    inserting into the tube from its outer extremity an expansion-swaging core comprising means for sealingly defining with the tube wall an annular pressure space of predetermined axial length within which expansion-swaging is to take place;
    locating the inner axial limit of said pressure space in the immediate vicinity of the inner edge of the tube plate bore;
    expansion-swaging the tube against the surrounding bore surface within the length of the annular pressure space, by injecting into said space a pressure medium under very high pressure, so that the tube is radially deformed into intimate hermetic contact with the bore surface;
    removing the expansion-swaging core; and
    roll-swaging at least a portion of the previously expansion-swaged tube portion, by radially compressing the tube wall and by thereby displacing some of the tube material inwardly away from the roll-swaged length portion, thereby reducing any tensile stress on the tube that may have been created as a result of the expansion-swaging operation.

2. A tube swaging method as defined in claim 1, applied in connection with a heat exchanger structure where straight tubes extend between two rigidly spaced tube plates, and wherein
    the steps of positioning the tube, of inserting an expansion-swaging core, of locating the inner pressure space limit, and of expansion-swaging the tube, are performed on both end portions of each tube; and
    the step of roll-swaging is performed on only one end portion of each tube.

3. A tube swaging method as defined in claim 1, wherein
    the step of roll-swaging is performed on only a portion of the previously expansion-swaged length portion.

4. A tube swaging method as defined in claim 3, comprising the additional steps of
    attaching the outer extremity of the tube to the outer edge portion of the tube plate bore by means of a weld; and
    locating the outer axial limit of the pressure space for the expansion-swaging step at a distance from said weld.

5. A tube swaging method as defined in claim 3, comprising the additional steps of
    attaching the outer extremity of the tube to the outer edge portion of the tube plate bore by means of a flared connection; and
    locating the outer axial limit of the pressure space for the expansion-swaging step at a distance from said flared connection.

6. A tube swaging method as defined in claim 3, wherein
    the step of roll-swaging is performed on a short portion of the previously expansion-swaged length portion, said short portion being located closer to the inner side of the tube plate than to is outer side.

7. A tube swaging method as defined in claim 3, applied in connection with a heat exchanger structure where straight tubes extend between two rigidly spaced tube plates, and wherein
    the axial extent and the radial depth of the roll-swaging deformation on the previously expansion-swaged tube length portion is chosen such that the tube material displaced axially inwardly from the roll-swaging region produces a predetermined compressive prestress in the tube.

8. A method of hermetically swaging tubes into the bores of tube plates, which method is particularly suited for the attachment of heat exchanger tubes to heavy tube plates having bores which are several times longer than wide, and whose diameter defines with the outer tube diameter an assembly clearance, said method comprising the steps of:
    positioning a tube in a tube plate bore in such a way that its major length portion extends from the inner side of the tube plate and its outer extremity is substantially in alignment with the outer side of the tube plate;
    inserting into the tube from its outer extremity an expansion-swaging core comprising means for sealingly defining with the tube wall an annular pressure space of predetermined axial length within which expansion-swaging is to take place;
    locating the inner axial limit of said pressure space near the inner edge of the tube plate bore in such a way that the subsequent expansion-swaging operation produces a diametral transition portion between the expanded and unexpanded length portions which, together with the edge portion of the bore, defines a short axial overlap where the tube wall is not in firm engagement with the bore surface;

expansion-swaging the tube against the surrounding bore surface within the length of the annular pressure space, by injecting into said space a pressure medium under very high pressure, so that the tube is radially deformed into intimate hermetic contact with the bore surface;

removing the expansion-swaging core; and roll-swaging at least a portion of the previoulsy expansion-swaged tube portion by radially compressing the tube wall and displacing some of the tube material inwardly away from the roll-swaged length portion, thereby axially shifting the tube out of the bore a distance which is at least equal to said overlap and in the process eliminating any annular crevice that might have existed in the overlapping length portion between the tube and the tube bore.

9. A tube swaging method as defined in claim 8, wherein the step of locating the inner pressure space limit and the step of roll-swaging are so coordinated with the prevailing manufacturing tolerances relating to the tube plate thickness and to the tube length, and also with the assembly tolerance with respect to the depth of expansion core insertion, that no annular crevice will be left after the roll-swaging operation, under any combination of said tolerances.

* * * * *